United States Patent [19]

Siska, Jr.

[11] Patent Number: 4,674,031
[45] Date of Patent: Jun. 16, 1987

[54] PERIPHERAL POWER SEQUENCER BASED ON PERIPHERAL SUSCEPTIBILITY TO AC TRANSIENTS

[75] Inventor: Andrew F. Siska, Jr., Westmont, Ill.

[73] Assignee: Cara Corporation, Lombard, Ill.

[21] Appl. No.: 791,413

[22] Filed: Oct. 25, 1985

[51] Int. Cl.$^4$ .............................. G05B 9/02; H02J 1/00
[52] U.S. Cl. ..................................... 364/184; 364/141;
364/143; 364/492; 364/200; 364/900; 307/38;
307/40; 307/41; 361/111
[58] Field of Search ............... 364/141, 143, 144, 146,
364/184, 900, 483, 492, 200; 307/38, 39, 40, 41;
361/111, 170

[56] References Cited

U.S. PATENT DOCUMENTS

| | | | |
|---|---|---|---|
| 4,172,280 | 10/1979 | Spiesman | 364/900 |
| 4,233,666 | 11/1980 | Walberg et al. | 364/900 |
| 4,242,621 | 12/1980 | Spaulding | 318/601 |
| 4,269,012 | 7/1981 | Beckedorff et al. | 364/146 |
| 4,312,035 | 1/1982 | Greene | 364/200 |
| 4,336,462 | 6/1982 | Hedges et al. | 307/38 |
| 4,371,789 | 2/1983 | Chen et al. | 307/38 |
| 4,401,930 | 8/1983 | Kato et al. | 364/474 |
| 4,408,281 | 10/1983 | Tack, Jr. et al. | 364/143 |
| 4,425,612 | 1/1984 | Bahler et al. | 307/40 |
| 4,453,208 | 6/1984 | Middleton et al. | 364/900 |
| 4,486,830 | 12/1984 | Taylor, Jr. et al. | 364/141 |
| 4,583,182 | 4/1986 | Breddan | 364/492 |
| 4,584,622 | 4/1986 | Crosby et al. | 361/111 |
| 4,593,349 | 6/1986 | Chase et al. | 364/200 |

Primary Examiner—Jerry Smith
Assistant Examiner—John R. Lastova
Attorney, Agent, or Firm—Emrich & Dithmar

[57] ABSTRACT

A controller for use with a computer terminal sequentially actuates a plurality of relays each coupled in a respective AC line wherein each of the AC lines is coupled to and energizes one of a plurality of computer terminal peripherals. The sequence in which the various peripherals are powered up is determined by the relative sensitivity of each peripheral to line voltage and switching transients, with the most sensitive peripherals energized last and the least sensitive peripherals energized first. A sufficient interval is provided between each sequential peripheral power up to allow for the settling out of switching transients. Upon computer terminal power down, the controller sequentially removes power from each of the peripherals in a reverse order with power first removed from those peripheral devices most sensitive to the aforementioned line voltage and switching transients. A time delay is also incorporated in the power down sequence to allow for the settling out of switching transients. The controller is programmable to allow for the incorporation of additional peripheral devices in the system or their deletion therefrom so as to accommodate the resulting change in peripheral device sequential power up and power down.

10 Claims, 12 Drawing Figures

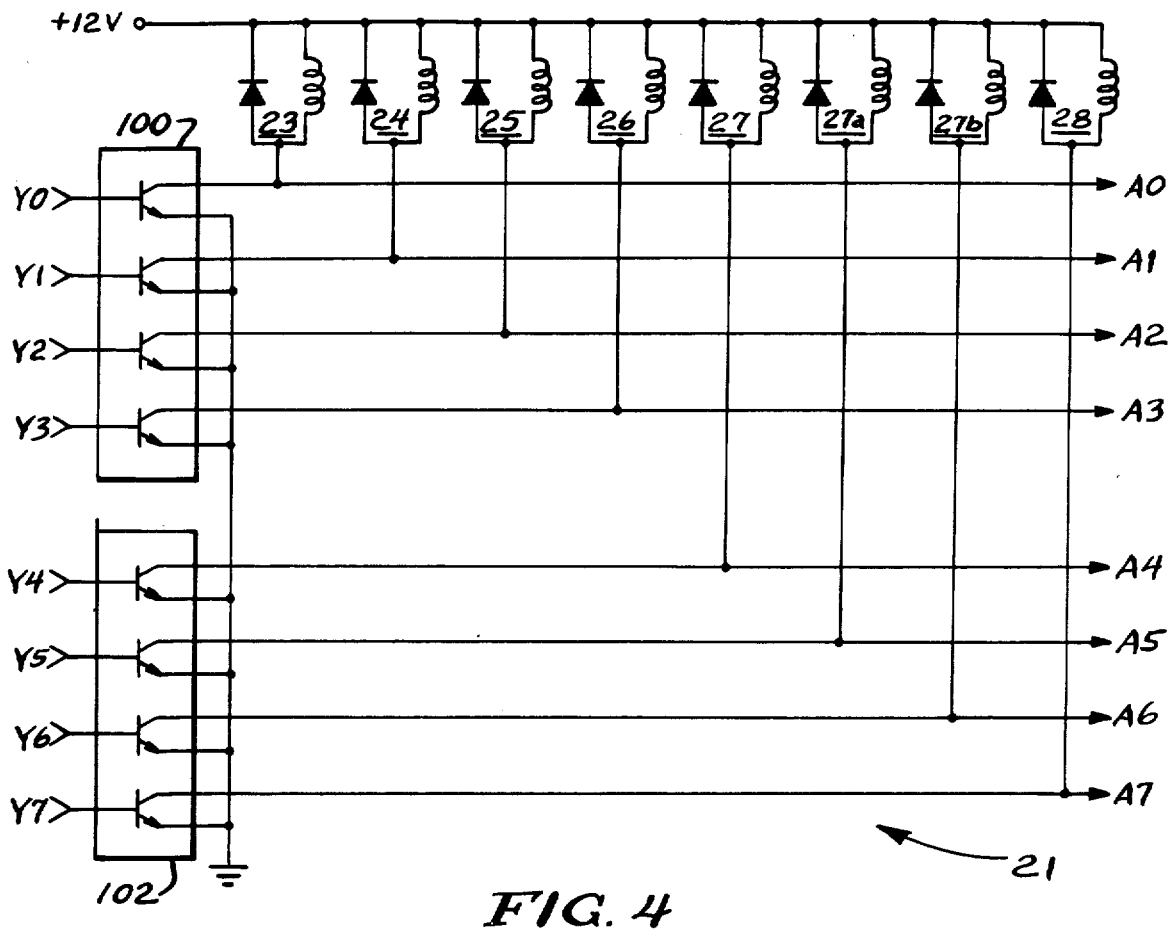
FIG. 4
FIG. 5
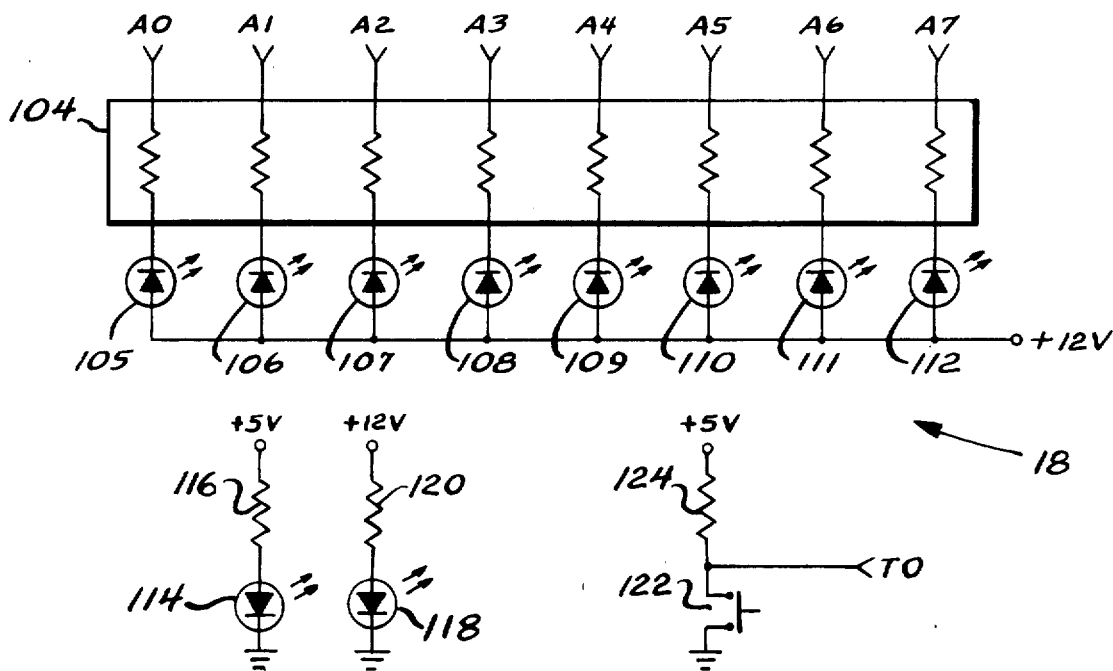

PERIPHERAL POWER SEQUENCER BASED ON PERIPHERAL SUSCEPTIBILITY TO AC TRANSIENTS

BACKGROUND OF THE INVENTION

This invention relates generally to computer power supplies and is particularly directed to an arrangement for sequentially energizing and de-energizing various peripherals in a computer system in a controlled, predetermined manner.

Electronic systems frequently include a controller and a plurality of controlled devices coupled thereto. The controller typically provides commands to the controlled devices which, in turn, perform specific functions and provide requested data back to the controller for processing therein. One example of such an arrangement is found in the typical computer controlled terminal wherein a central processor unit (CPU) receives user initiated inputs such as from a keyboard and provides various control outputs to peripheral devices in the system. These peripherals may include the keyboard itself, a video display, a printer, a plotter, a modem and perhaps a disc memory.

In the prior art, these various peripherals have typically been energized during power up simultaneously at the start of computer terminal operation. However, each of these peripherals exhibits a unique, individual level of sensitivity or susceptibility to variations in the input power applied thereto. Thus, input voltage transients affect each of the aforementioned peripherals in a different manner in accordance with their respective operating characteristics. For example, because a disc memory device is more sensitive to input voltage variations than a printer, an AC line voltage variation may alter or completely erase data stored in the disc memory, or may even result in damage thereto, while having little or no affect on printer operation.

Input voltage transients are most frequently encountered when power is initially applied to or removed from the peripheral device. This variation is the result of AC line characteristics as well as voltage regulation limitations in the device itself. In addition, when several devices are connected in a common circuit and are powered up or turned on in a near simultaneous manner, the load variations imposed on the AC line frequently result in variations in the input voltage. These input voltage variations may not only prevent normal system operation, but may even damage various of the peripheral devices therein.

The present invention addresses the aforementioned problems encountered in the prior art in providing a computer power controller which sequentially and in a predetermined manner applies input power to and removes input power from a plurality of peripherals in a computer controlled system during system power up and power down. The sequence in which the supply voltage is applied to and removed from the various peripheral devices is determined by their relative sensitivity to input voltage and switching transients.

OBJECTS OF THE INVENTION

Accordingly, it is an object of the present invention to provide an improved arrangement for controlling the operation of a plurality of peripherals in a computer terminal.

It is another object of the present invention to accommodate the relative sensitivity of computer peripherals to input voltage variations by controlling the manner in which the peripherals are energized and de-energized.

Yet another object of the present invention is to substantially eliminate damage to and improper operating states in various peripherals of a computer terminal arising from input voltage transients which occur during terminal power up and power down.

A further object of the present invention is to provide a programmable power supply controller for regulating the manner in which a supply voltage is applied to and removal from a plurality of electronic devices.

The present invention contemplates a programmable power supply controller for regulating the manner in which input power is applied to and removed from a plurality of electronic devices, each exhibiting a unique, individual sensitivity to variations in the input power. Input power is sequentially applied to each of the electronic devices such that those devices least sensitive to input voltage variations are energized first and those devices most sensitive to such variations are energized last. A reverse sequence is used in system power down with power removed from the most sensitive devices first and from the least sensitive devices last. During the power up and power down sequences, sufficient time is provided between successive device power up and power down to allow for the settling out of switching transients to eliminate this source of operating irregularities. The controller of the present invention is programmable to provide flexibiliy in the numbers and types of electronic devices controlled and is particularly adapted for use in a computer terminal having a plurality of peripheral devices such as a printer, a disc memory, a modem, etc., which operate under the control of a central processor unit. In one embodiment, a plurality of relays each coupled to a respective switch in an AC line are sequentially actuated by the controller in a predetermined manner for sequentially applying power to or removing power from a plurality of electronic devices each coupled to the AC line.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 4 is a schematic diagram of a relay driver circuit for use in the computer power controller of the present invention;

FIG. 5 is a schematic diagram of a device status light emitting diode (LED) display circuit for use in the computer power controller of the present invention;

DESCRIPTION OF THE PREFERRED EMBODIMENT

Figure 1:
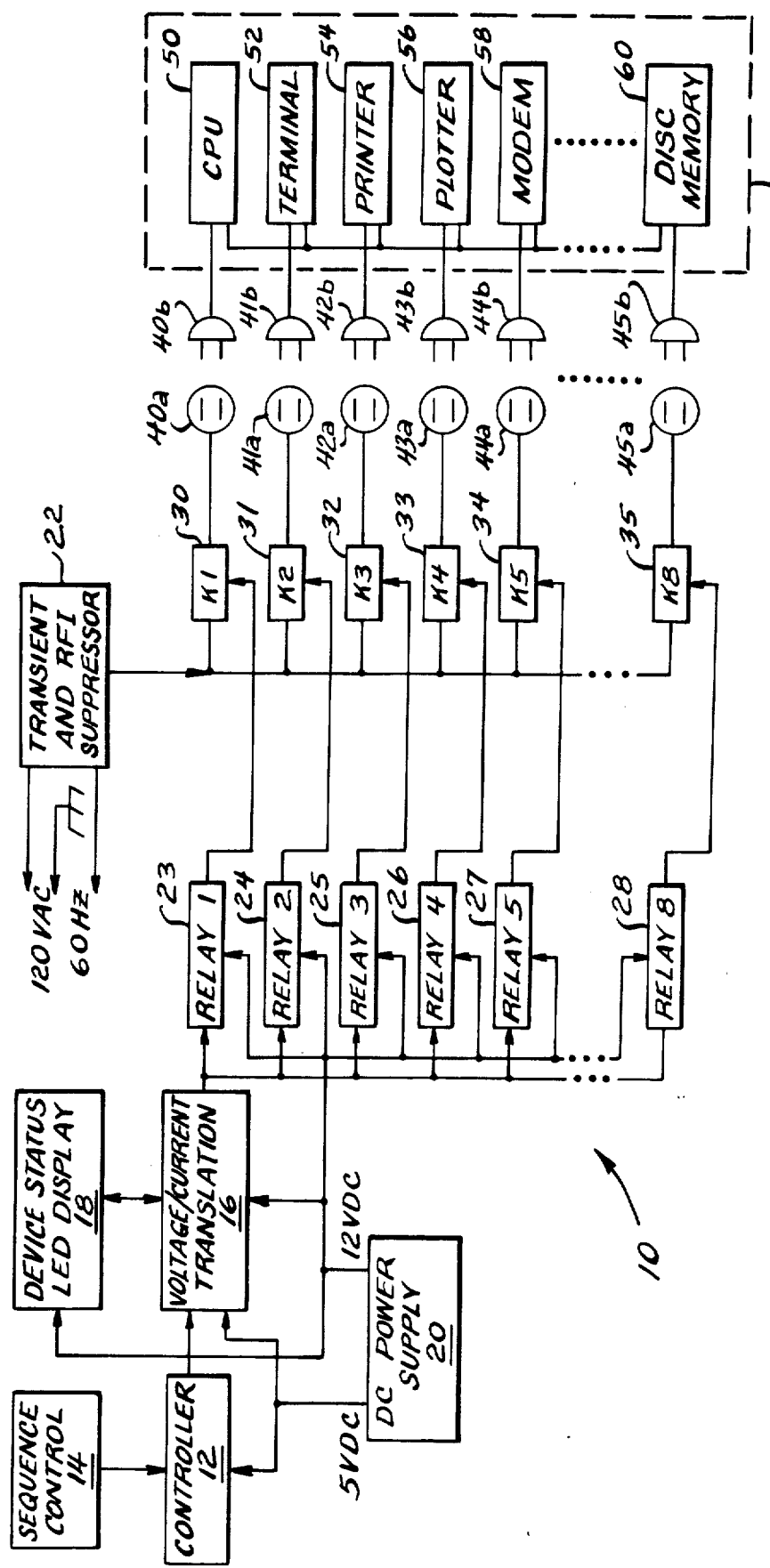
FIG. 1 is a simplified block diagram of a computer power controller in accordance with the present invention.

Referring to FIG. 1, there is shown in block diagram form a computer power controller 10 for use with a computer system 11 in accordance with the present invention.

The computer power controller 10 is adapted for coupling to an AC source such as a conventional 120 VAC, 60 Hz line for energizing a central processor unit 50, or a computer as these terms are used interchangeably in the following paragraphs, as well as a plurality of computer peripherals coupled thereto and controlled thereby. These peripherals may include, but are not limited to, a computer terminal 52, a printer 54, a plotter 56, a modem 58, and a hard disc memory 60. The sequence of dots between the modem 58 and the disc memory 60 is intended to indicate that various other computer peripherals may be energized by the computer power controller 10 of the present invention. By computer terminal is meant a video display (not shown) such as a cathode ray tube and associated drive circuitry.

The computer power controller 10 operates to apply power sequentially to each of the aforementioned peripherals in a first predetermined order when the computer system 11 is initially energized and to remove power from each of the aforementioned peripherals in a second predetermined order upon shutdown of the computer system. In accordance with the principles of the present invention, the first and second aforementioned predetermined orders are the reverse of one another such that the first peripheral energized is the last peripheral turned off and the last peripheral energized is the first peripheral from which power is removed upon computer system 11 shutdown. In this manner, those peripherals which are most sensitive to line voltage and switching transients are turned on last and turned off first to minimize the possibility of damage to or improper operation of these peripherals. In addition, a timing delay is provided between the sequential power up and power down of individual peripherals to allow switching transients to settle out before another peripheral is powered up or powered down. As shown in FIG. 1, those peripherals which are less susceptible to line voltage and switching transients, such as the CPU 50, the computer terminal 52 and the printer 54, are sequentially actuated first upon power up, while those components such as the plotter 56, the modem 58 and the disc memory 60 are sequentially actuated last during computer system power up. Power down of the computer system 11 results in the shut down of the disc memory 60 first and the CPU 50 last with those peripherals positioned therebetween sequentially deactivated in the order shown.

The computer power controller 10 includes a controller 12 incorporating a microcontroller comprised of a microprocessor or microcomputer (not shown in FIG. 1) which operates in accordance with a sequence control 14. The sequence control 14 is a computer program stored in a read only memory (ROM) (also not shown in FIG. 1) which regulates the operation of the controller 12. The sequence control 14 is typically stored in a read only memory (ROM) within or external to the controller 12 in the case of a microcontroller, or is stored in an external ROM where the controller 12 is a microprocessor.

Figure 2:
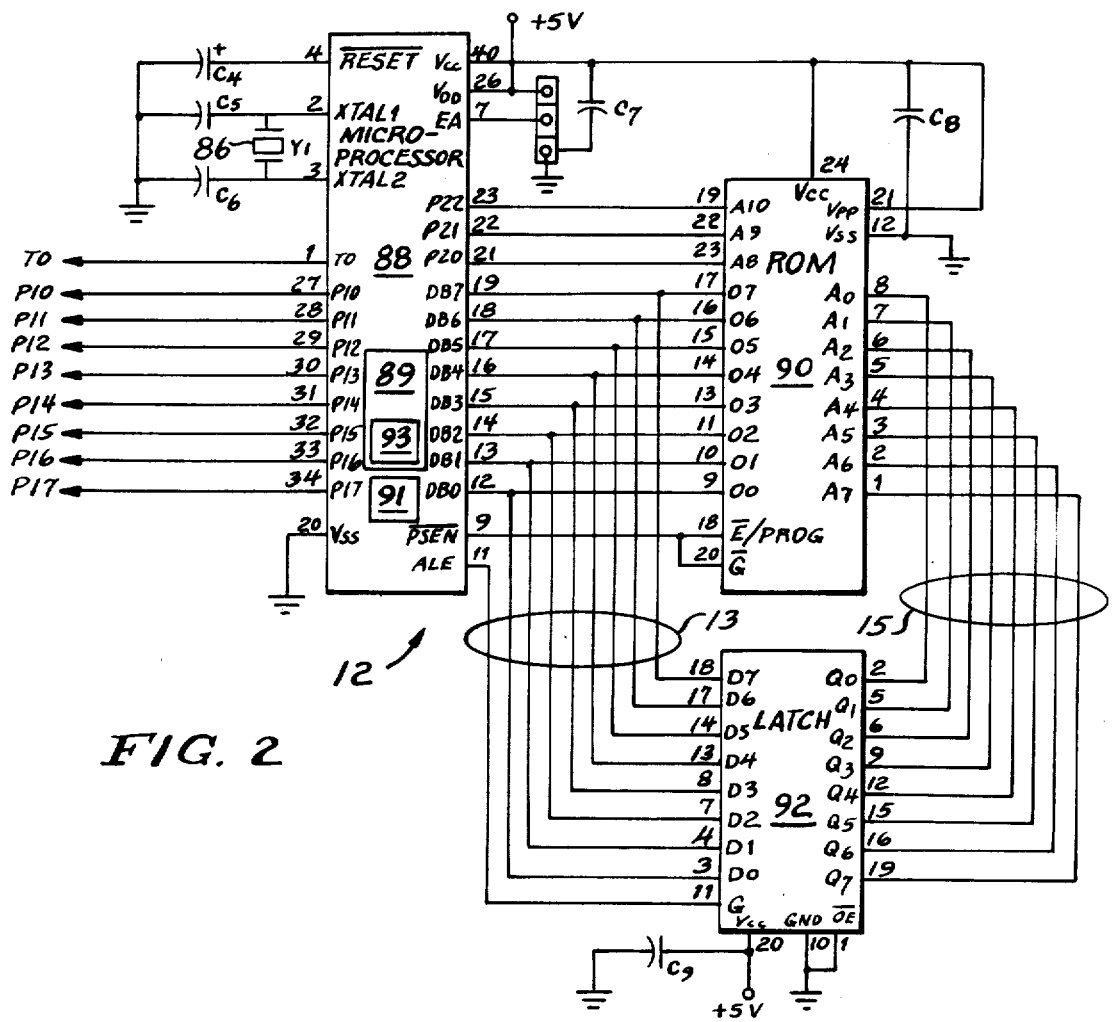
FIG. 2 is a combined schematic and block diagram of a controller for use in the computer power controller of FIG. 1.

Referring to FIG. 2, the details of the controller 12 are shown in combined block and schematic diagram form. The controller 12 includes a microcontroller 88, which in a preferred embodiment is the Signetics SCN 8035. Timing for the microcontroller 88 is provided by means of an external crystal oscillator 86 and an associated capacitive network coupled thereto. The microcontroller 88 is coupled to and provides control information via an eight line address bus to a latch 92, which in a preferred embodiment is a 74LS373 octal latch. Address information is provided via an 8-bit address bus 13 from pins DB0-DB7 of the microcontroller 88 to the latch 92. This address information is provided via a second address bus 15 to a ROM 90 for accessing the next line of code stored in a given address within the ROM. In a preferred embodiment, the ROM 90 is an erasable programmable read only memory (EPROM) which may be selectively programmed in accordance with the number of peripherals energized by the computer power controller 10 as well as the order in which these peripherals are powered up and powered down.

Within the various addressable locations in the ROM 90 is stored a coded operating program which is illustrated in Table I. In proceeding from left to right in Table I, the first column indicates the address in hexadecimal notation within which a given set of data resides. The second and third columns represent the actual instruction in hexadecimal notation stored in the address location of column 1, while the fourth and fifth columns contain a mnemonic representation of the instructions set forth in columns 2 and 3. The last, or right hand, column in Table I provides a brief description of the operation carried out by the data instructions of columns 2 and 3 stored in the addressable location indicated in column 1. The various data stored within the ROM 90 is selectively read therefrom and provided to the microcontroller 88 for controlling the operation thereof. The specific sequence of operations carried out by the microcontroller 88 as these operations relate to the information contained in Table I is described in detail below with respect to FIGS. 8-12. In accordance with the instructions provided from the ROM 90 to the microcontroller 88, various outputs are provided on output pins P10-P17 of the microcontroller to a voltage/current translation circuit 16.

Figure 3:
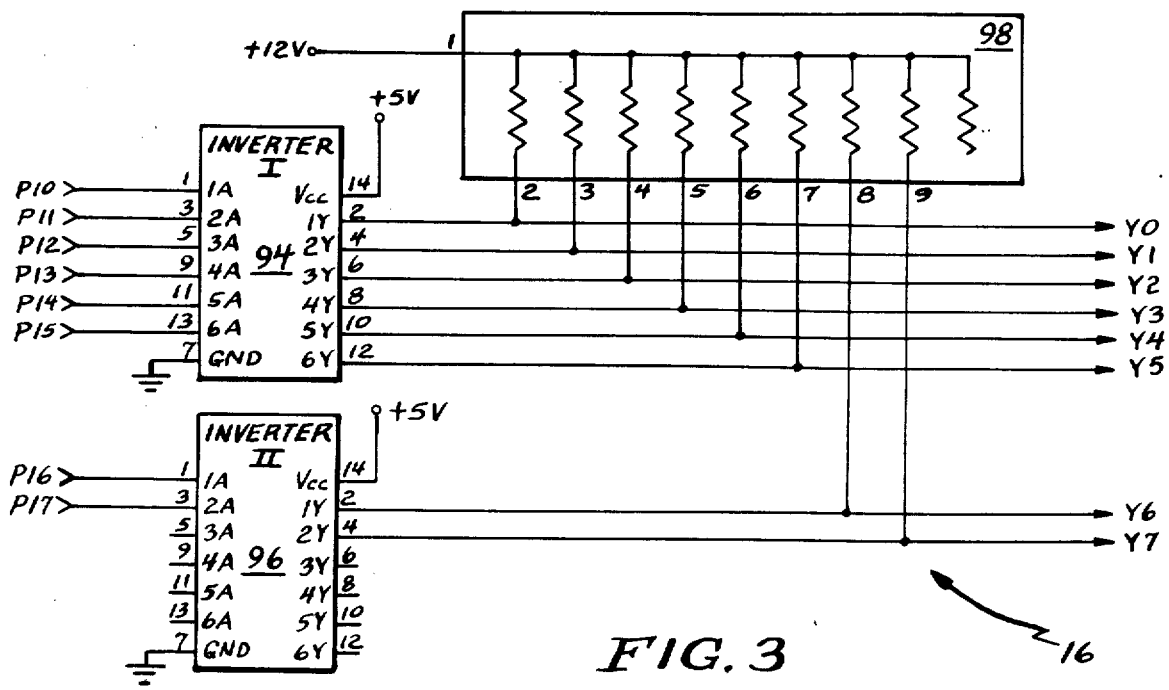
FIG. 3 is a combined schematic and block diagram of a voltage/current translation circuit for use in the oomputer power controller of the present invention.

Referring to FIG. 3, the aforementioned outputs from the microcontroller 88 are provided to first and second inverters 94, 96 within the voltage/current translation circuit 16.

TABLE I

| | | | | | PROCESSOR RESET CODE SECTION |
|---|---|---|---|---|---|
| 00 | 04 | 10 | JMP | 10 | POWER ON RESET JUMP VECTOR |
| 02 | 00 | | NOP | | |
| 03 | 93 | | RETR | | INTERRUPT REQUEST JUMP VECTOR |
| 04 | 00 | | NOP | | |

TABLE I-continued

| | | | | | |
|---|---|---|---|---|---|
| 05 | 00 | | NOP | | |
| 06 | 00 | | NOP | | |
| 07 | 04 | 70 | JMP | 70 | TIMER INTERRUPT REQUEST JUMP VECTOR |
| 09 | 00 | | NOP | | |
| | | | POWER UP - POWER DOWN CODE SECTION | | |
| 10 | 23 | FF | MOV | A,FF | STORE 'OFF' IN RELAY STATUS REGISTER |
| 12 | AA | | MOV | R2,A | |
| 13 | 39 | | OUTL | P1,A | TURN RELAYS OFF |
| 14 | 36 | 14 | JT0 | 14 | WAIT HERE UNTIL SEQUENCE BUTTON IS DEPRESSED |
| 16 | FA | | MOV | A,R2 | CHECK RELAY STATUS. IF ON (00H) TURN THEM OFF. IF OFF (FFH) TURN THEM ON |
| 17 | C6 | 27 | JZ | 28 | |
| | | | POWER UP SEQUENCE | | |
| 19 | BA | 00 | MOV | R2,00 | STORE 'ON' IN RELAY STAUS REGISTER |
| 1B | B8 | 08 | MOV | R0,08 | NUMBER OF DEVICES TO TURN ON |
| 1D | F8 | | MOV | A,R0 | |
| 1E | 03 | EE | ADD | A,EE | ADD NUMBER OF DEVICES TO ADDRESS OF TURN ON BYTES |
| 20 | A3 | | MOVP | A,@A | LOAD TURN ON BYTE INTO ACCUMULATOR |
| 21 | 39 | | OUTL | P1,A | TURN ON RELAY |
| 22 | 14 | 50 | CALL | 50 | WAIT FOR ONE SECOND |
| 24 | E8 | 1D | DJNZ | R0,1D | DECREMENT DEVICE COUNT |
| 26 | 04 | 14 | JMP | 14 | RETURN TO WAIT STATE |
| | | | POWER DOWN SEQUENCE | | |
| 28 | BA | FF | MOV | R2,FF | STORE 'OFF' IN RELAY STATUS REGISTER |
| 2A | B8 | 08 | MOV | R0,08 | NUMBER OF DEVICES TO TURN OFF |
| 2C | F8 | | MOV | A,R0 | |
| 2D | 03 | F6 | ADD | A,F6 | ADD NUMBER OF DEVICES TO ADDRESS OF TURN OFF BYTES |
| 2F | A3 | | MOVP | A,@A | LOAD TURN OFF BYTE INTO ACCUMULATOR |
| 30 | 39 | | OUTL | P1,A | TURN OFF RELAY |
| 31 | 14 | 50 | CALL | 50 | WAIT ONE SECOND |
| 33 | E8 | 2B | DJNZ | R0,2C | DECREMENT DEVICE COUNT |
| 35 | 04 | 14 | JMP | 14 | RETURN TO WAIT STATE |
| | | | ONE-SECOND TIME DELAY ROUTINE | | |
| 50 | BB | 32 | MOV | R3,32 | LOAD R3 WITH NUMBER OF INTERRUPTS REQUIRED TO MAKE ONE SECOND |
| 52 | 23 | 06 | MOV | A,06 | LOAD TIMER WITH NUMBER TO COUNTS |
| 54 | 62 | | MOV | T,A | |
| 55 | 55 | | STRT | T | START TIMER AND ENABLE TIMER INTERRUPTS |
| 56 | 25 | | EN | TCNTI | |
| 57 | FB | | MOV | A,R3 | WATCH R3 UNTIL CONTENTS TURN TO ZERO |
| 58 | 96 | 57 | JNZ | 57 | |
| 5A | 35 | | DIS | TCNTI | DISABLE TIMER AND TIMER GENERATED INTERRUPTS |
| 5B | 65 | | STOP | TCNT | |
| 5C | 93 | | RETR | | EXIT ONE SECOND TIME DELAY ROUTINE |
| | | | TIMER INTERRUPT ROUTINE | | |
| 70 | 35 | | DIS | TCNTI | DISABLE TIMER INTERRUPTS AND STOP TIMER |
| 71 | 65 | | STOP | TCNT | |
| 72 | CB | | DEC | R3 | DECREMENT THE CONTENTS OF R3 |
| 73 | AC | | MOV | R4,A | |
| 74 | 23 | 06 | MOV | A,06 | LOAD TIMER WITH NUMBER OF COUNTS |
| 76 | 62 | | MOV | T,A | |
| 77 | FC | | MOV | A,R4 | |
| 78 | 55 | | STRT | T | START TIMER AND ENABLE TIMER INTERRUPTS |
| 79 | 25 | | EN | TCNTI | |
| 7A | 93 | | RETR | | EXIT FROM TIMER INTERRUPT ROUTINE |
| | | | DATA MEMORY FOR UP/DOWN POWER SEQUENCE | | |
| ON SEQUENCE DATA BYTES | | | | | |
| EF | 00 | (00000000) | | | |
| F0 | 80 | (10000000) | | | |
| F1 | C0 | (11000000) | | | |
| F2 | E0 | (11100000) | | | |
| F3 | F0 | (11110000) | | | |
| F4 | F8 | (11111000) | | | |
| F5 | FC | (11111100) | | | |
| F6 | FE | (11111110) | | | |
| OFF SEQUENCE DATA BYTES | | | | | |
| F7 | FF | (11111111) | | | |
| F8 | FE | (11111110) | | | |
| F9 | FC | (11111100) | | | |
| FA | F8 | (11111000) | | | |
| FB | F0 | (11110000) | | | |
| FC | E0 | (11100000) | | | |
| FD | C0 | (11000000) | | | |
| FE | 80 | (10000000) | | | |

The inverters 94, 96, which in a preferred embodiment are 7406 integrated circuits, are coupled to a pull-up resistor strip 98 which includes a plurality of pull-up resistors coupled to a +12 VDC source. The voltage and current values of the output of the microcontroller 88 are low and are capable of only driving a single TTL load. The combination of inverters 94 and 96 and the pull-up resistor strip 98 serves to increase the outputs from the microcontroller 88 from +5 to +12 VDC so as to provide sufficient current and voltage for driving a plurality of relays as described below.

The inverters 94, 96 provide a low output to the aforementioned relays (which are not shown in FIG. 3) upon initial system power up to ensure that the relays are not actuated following the application of input power to the system. The voltage/current translation circuit 16 thus converts the +5 VDC to a +12 VDC for driving the various relays as described below. As shown in FIG. 3, only two of the six input and output pins of the second inverter 96 are utilized. This is not a limitation of the present invention, but rather is a result of the 8-bit data bus coupled to the eight output pins of the microcontroller 88. The present invention is not limited to use with any specific number of relays or peripheral devices coupled thereto, but has application to virtually any number and combination of computer terminal peripherals.

Referring to FIG. 4, there is shown in schematic diagram form the details of a relay driver circuit 21 for use in the computer power controller 10 of the present invention. As shown in FIG. 4, four of the +12 VDC outputs from the voltage/current translation circuit are provided to a first transistor switch array 100, while the remaining four outputs of the voltage/current translation circuit are provided to a second transistor switch array 102. Each of the NPN transistors in the first and second transistor switch arrays 100, 102 is responsive to a +12 VDC input provided to the base thereof for sourcing additional current to a respective relay to which the NPN transistor is coupled. The +12 VDC input signals provided to each of the first and second transistor switch assemblies 100, 102 are on the order of 5 milliamps. Each of the aforementioned NPN transistors provides an increase in current to approximately 50 milliamps which is necessary for driving each of the relays 23-27, 27a, 27b and 28. The additional relays 27a, 27b are shown interposed between relays 27 and 28 to illustrate that the present invention is not limited to driving a given number of relays and powering up/-powering down a given number of associated computer system peripherals. Each of the relays 23-27, 27a, 27b and 28 is comprised of a respective parallel arrangement of a diode coupled to a +12 VDC source for providing protection from relay coil back EMF to the invention's circuitry as shown in FIG. 4.

As shown in FIG. 5, which is a schematic diagram of a device status LED display 18, the A0-A7 outputs from the voltage/current translation circuit are respectively provided via a pull-up resistor array 104 to LED's 105-112. The pull-up resistor array 104 includes a plurality of resistors each coupled to the cathode of a respective LED for ensuring the turn-on thereof upon receipt of an input provided from the voltage/current translation circuit via a respective one of the lines A0-A7. Each of the LED's 105 through 112 has associated therewith a respective one of the aforementioned relays 23-27, 27a, 27b and 28. For example, a Y0 input provided to the first transistor switch 100, not only actuates relay 23 but also provides an A0 output from the relay driver circuit 21 which is provided via a respective resistor within the pull-up resistor array 104 to the cathode of LED 105. Illumination of LED 105 provides a visual indication that relay 23 has been actuated for applying power to a peripheral device associated therewith as described below. With a respective NPN transistor within each of the first and second transistor switches 100, 102 coupled to ground and rendered conductive by an input provided to its base from the voltage/current translation circuit 16, a +12 VDC is applied across an associated relay for the actuation thereof as well as across an associated LED for the illumination thereof in providing a visual indication of those peripherals to which power has been applied.

Also shown in FIG. 5 are status LED's 114, 118 respectively coupled to the +5 and +12 VDC sources via resistors 116 and 120. Illumination of LED 114 indicates that the +5 VDC supply is up and operating, while illumination of LED 118 indicates that the +12 VDC supply is up and operating. Also shown in FIG. 5 is a turn-on/turn-off switch arrangement which includes a manually actuated selector switch 122 coupled to the +5 VDC source via resistor 124. With the selector switch 122 not engaged, the T0 line and the T0 input pin of the microcontroller 88 as shown in FIG. 2 is held high or at a +5 DC level. Engagement of the selector switch 122 applies a low or 0 VDC level to the T0 input pin of microcontroller 88 resulting in the turn-on thereof. When the selector switch 122 is deselected, the 0 VDC is removed from the T0 input pin of the microcontroller 88. Thus, initial engagement of the selector switch 122 enables the microcontroller 88 to turn on the relays as well as the various aforementioned peripheral devices, while subsequent engagement of the selector switch turns off the relays and the various peripheral devices coupled thereto.

Figure 6:
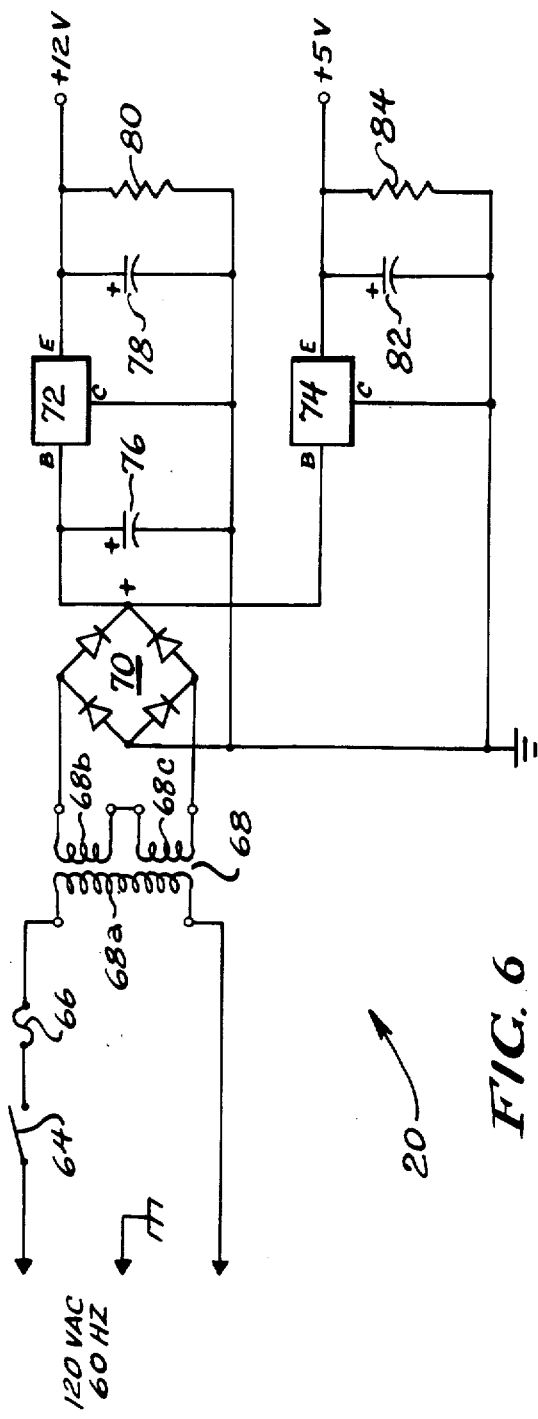
FIG. 6 is a combined schematic and block diagram of a DC power supply for use in the computer power controller of the present invention.

Referring to FIG. 6, there is shown a simplified schematic diagram of a DC power supply 20 for use in the computer power controller of the present invention. A 120 VAC source is coupled via a switch 64 and a fuse 66 to the primary winding 68a of a step-down transformer 68. A pair of secondary windings 68b, 68c of the step-down transformer 68 are coupled across a rectifying bridge 70 from which a DC output is derived. The DC output from the rectifying bridge 70 is provided to a first voltage regulator 72 from which +12 VDC is derived and a second voltage regulator 74 from which a +5 VDC is derived. In a preferred embodiment, the first voltage regulator 72 is a 7812 voltage regulator, while the second voltage regulator 74 is a 7805 voltage regulator. Capacitor 76 and the combination of capacitor 78 and resistor 80 respectively coupled across the input and output of the first voltage regulator 72 to neutral ground provide filtering for the +12 VDC output therefrom. Similarly, the parallel combination of capacitor 82 and resistor 84 coupled across the output of the second voltage regulator 74 to neutral ground potential provides filtering for the +5 VDC output therefrom. The +12 and +5 VDC outputs from the DC power supply 20 are provided to various portions of the computer power controller 10 for the actuation thereof as shown in FIG. 1.

Figure 7:
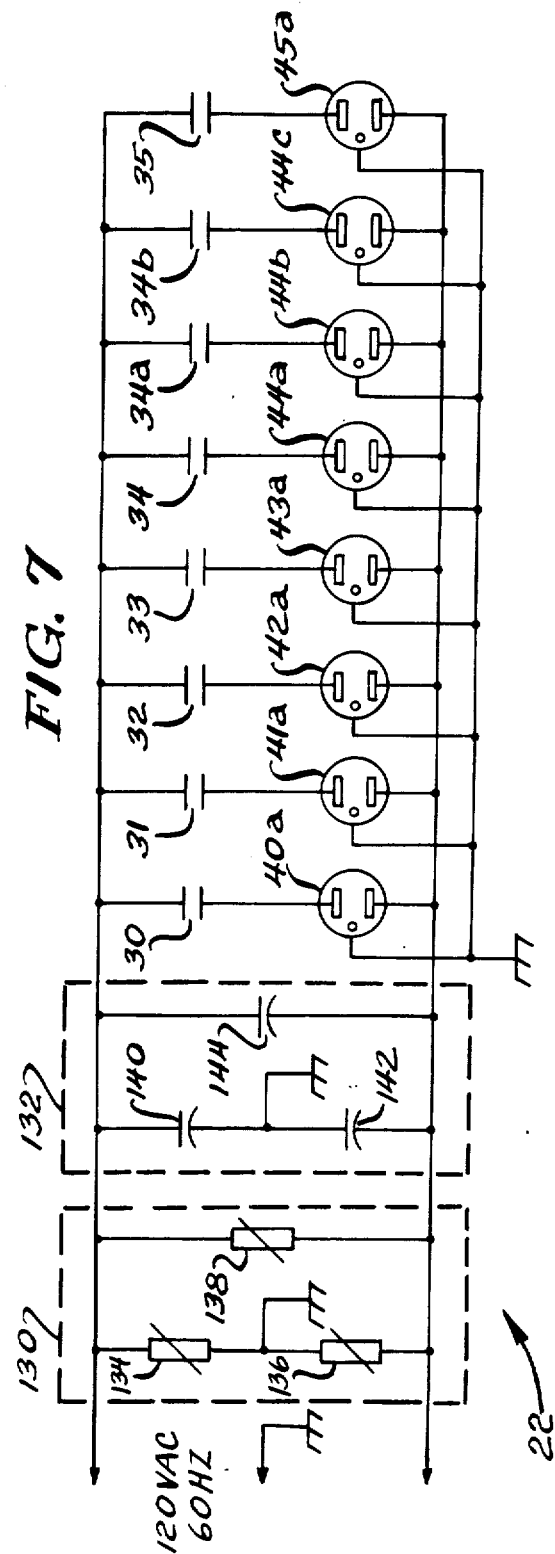
FIG. 7 is a schematic diagram of a transient and RFI suppression filter for use in the computer power controller of the present invention.

Referring to FIG. 7, there is shown in schematic diagram form a transient and RFI suppressor circuit 22 for use in the computer power controller 10 of the present invention. The transient and RFI suppressor circuit 22 is coupled to the AC source and includes a transient suppressor circuit 130 and an EMI/RFI filter 132. The transient suppressor circuit 130 includes first and second metal oxide varistors (MOV's) 134 and 136 respectively coupling the hot and neutral lines of the AC source to neutral ground potential. A third MOV 138 is coupled across the hot and neutral lines of the AC source. The combination of the first and second MOV's 134, 136 and the third MOV 138 respectively provide common and differential mode suppression of transients in the AC source. The first, second and third MOV's 134, 136 and 138 are conventional metal oxide varistors exhibiting a resistance which is non-linearly inversely proportional to the voltage applied thereacross such that each functions basically as an open circuit until the voltage thereacross exceeds a predetermined AC voltage whereupon the MOV is rendered conductive and acts as a short for grounding unwanted AC voltage transients.

The EMI/RFI filter 132 includes the combination of capacitors 140 and 142 respectively coupling the hot and neutral lines of the AC source to neutral ground potential. The EMI/RFI filter 132 further includes a third capacitor 144 coupled across the hot and neutral lines of the VAC input. The first and second capacitors 140, 142 provide common mode filtering, while the third capacitor 144 provides differential mode filtering for the AC input voltage. The EMI/RFI filter 132 serves to filter out spurious high frequency signals from the AC input line.

As shown in FIG. 1, each of the relays shown in FIG. 4 is coupled to a respective contact shown in FIG. 7. Thus, relays 23 through 28 are respectively coupled to contacts 30 through 35 as shown in FIG. 1. Contacts 31-34, 34a, 34b and 35 are respectively coupled in turn to AC female receptacles 40a-44a, 44b, 44c and 45a as shown in FIG. 7. Actuation of a respective relay results in engagement of a corresponding contact coupled thereto for energizing a respective peripheral device. As shown in FIG. 1, the CPU 50, terminal 52, plotter 56, modem 58 and the disc memory 60 are respectively coupled to male plugs 40b through 45b. Insertion of a respective male plug into a corresponding female receptacle provides an AC input to a respective peripheral device with the contacts coupled thereto engaged for the operation thereof.

The manner in which an AC input voltage is provided to and removed from each of the aforementioned peripheral devices will now be described with respect to FIGS. 8 through 12 which are a series of flow charts representing various operations carried out in the computer power controller 10 under the control of the controller 12. The reading of the various operating instructions set forth in Table I from the ROM 90 by the microcontroller 88 causes the microcontroller to carry out the various operations set forth in FIGS. 8-12 and discussed in detail below. In referring to FIGS. 8-12, an oval symbol indicates the start of an operational sequence, a rectangle indicates an instruction or set of instructions resulting in the performance of a control function, and a diamond indicates a decision point based upon the comparison of binary signal inputs.

Figure 8:
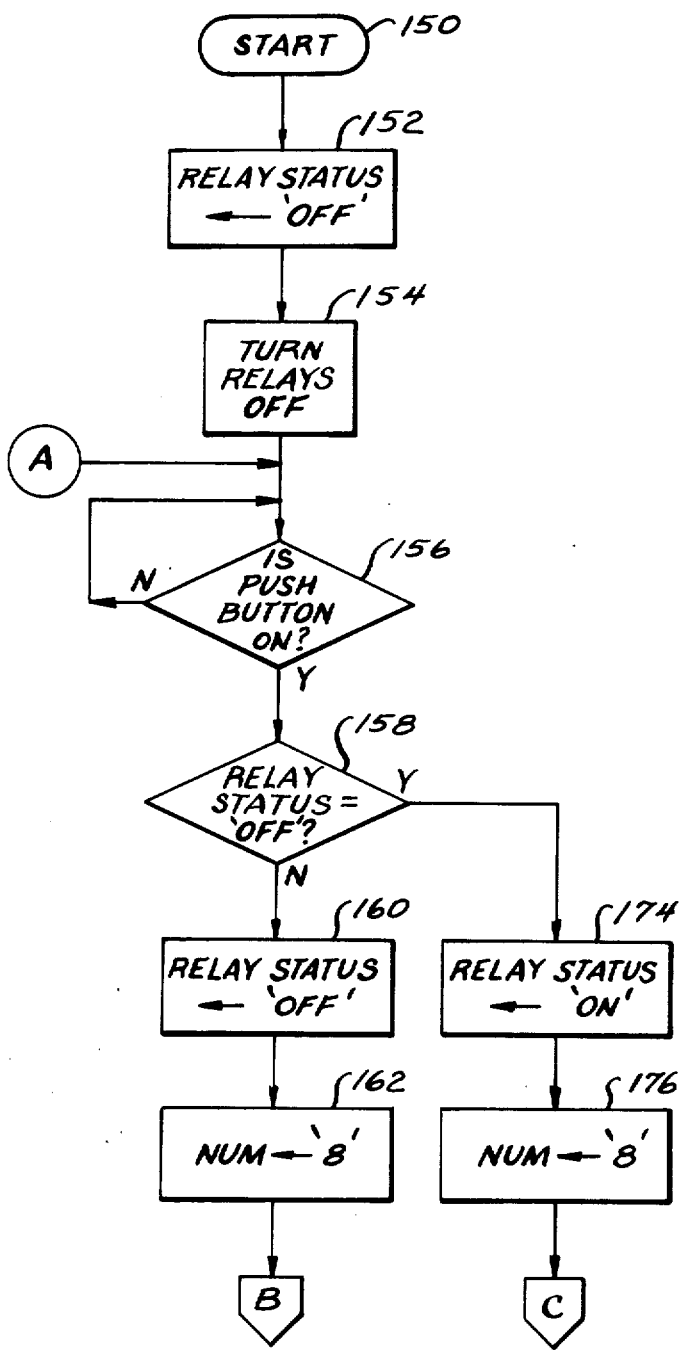
FIGS. 8-12 are a series of flow charts illustrating the sequence of operations carried out by the programmable controller in the computer power control system of the present invention.

Referring to FIG. 8, when the microcontroller 88 is first powered up, a "power up vector" is executed at step 150 whereby the microcontroller goes to address location 00 in the ROM 90 and begins executing the code stored therein. At step 152, the relay status register within the microcontroller's RAM 89 is loaded with FF in hexadecimal notation to indicate to the microcontroller that all of the relays are off. The microcontroller then provides high outputs on its pins P10-P17 in order to turn off all of the relays at step 154. The program stored within the ROM 90 then causes the microcontroller 88 to monitor its T0 input pin in order to determine at step 156 if the selector switch 122 shown in FIG. 5 is engaged. With the selector switch 122 not engaged, a logic 1 is provided to the T0 input pin of the microcontroller 88. The program executes a loop at step 156 until engagement of the selector switch 122 is detected whereupon the program branches to step 158 for determining the status of all of the relays 23 through 28.

Figure 9:
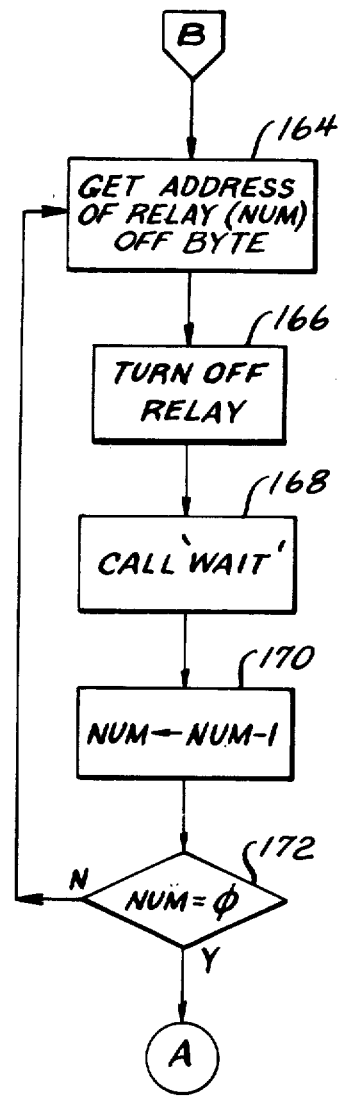

If at step 158 it is determined that the relays are on, the program branches to step 160 and executes a routine for turning all of the relays off. This involves a sequential process wherein the OFF SEQUENCE DATA BYTES shown at the bottom of Table I are loaded into the microcontroller 88 from the ROM 90 for controlling the P10-P17 outputs therefrom. At step 162, the number "8" representing the number of relays is loaded into the microcontroller's RAM 89. The microcontroller 88 then reads the address of the appropriate relay OFF BYTE at step 164 and proceeds to step 166 for providing a high output from a respective output pin P10-P17 to the appropriate relay. As shown in Table I, a hexadecimal 80 is read from the FE address location within the ROM and provided to the microcontroller for turning relay 28 off. After the desired relay is turned off at step 166, a WAIT subroutine is executed at 168 before decrementing the relay number by 1 at step 170. This sequential relay turn off and relay number decrementing process continues in a closed loop fashion as shown in FIG. 9 until relay No. 1 is turned off as detected at step 172 where the number of the relay turned off minus 1 equals 0. As shown at the bottom of Table I, this process involves the loading of 1's from left to right in the data bytes corresponding to each of the relays in sequence. Thus, a (10000000) is read into the location corresponding to the eighth relay for turning this relay off, a (11000000) is read into the location corresponding to the seventh relay for turning this relay off, and so forth. After all of the relays have been turned off, the program executes a loop and returns to step 156 for detecting a subsequent engagement of the selector switch.

Figures 10, 11, 12:
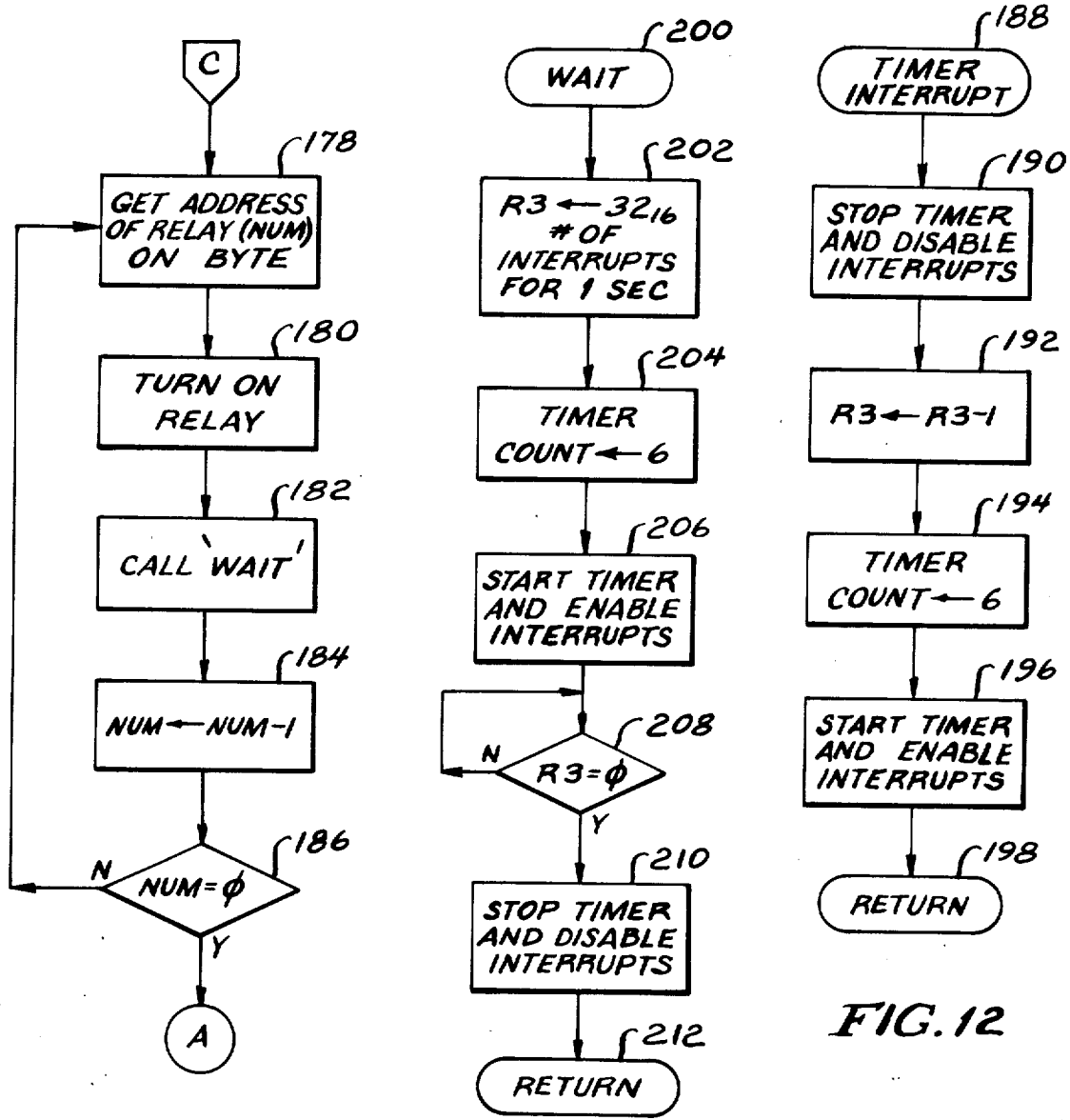

If at step 158, it is determined that the selector switch 122 has been selected and all of the relays are off, the program branches at step 158 to step 174 for executing a relay turn on routine. As in the case of the turn-off routine, the turn on routine initially loads a number representing the number of relays in the system which in the present example is 8 at step 176. The program then at step 178 reads the address of relay 23 and turns on this relay at step 180 by providing a (11111110) output from lines P10-P17 of the microcontroller 88 as shown in the ON SEQUENCE DATA BYTES at the bottom of Table I. This results in the turn on of relay 23 at step 180 followed by execution of the aforementioned WAIT routine at step 182. The number 8 is then decremented at step 184 for turning on the next relay in sequence which as shown in FIG. 1 is relay 24. Relay 24 is then turned on by providing an output of (11111100) from the P10–P17 output lines of the microcontroller 88. This procedure continues as shown in the loop of FIG. 10 until the eighth relay, i.e., relay 35, is turned on by an output of (00000000) from the microcontroller 88. From the order of the ON SEQUENCE DATA BYTES shown in Table I, it can be seen that the first relay is turned on, followed by the turn on of the second relay and then the third relay and so forth by sequentially changing consecutive bits in these bytes. Thus, the relays are sequentially turned on in an order reversed from that in which they are turned off as indicated by the content of the OFF SEQUENCE DATA BYTES wherein the eighth relay is turned off first and the first relay is turned off last. Following the turn on of all the relays, i.e., when the number of the relay to be turned on minus 1 equals 0, the program returns to step 156 for detection of the next engagement of the selector switch 122.

Referring to FIG. 11, there is shown a flow chart for the WAIT subroutine initiated at step 200 for providing a predetermined timing delay in the sequential turn-on and turn-off of the various peripherals to allow supply voltage transients to settle out before the next peripheral is either turned on or turned off. Following engagement or disengagement of one of the aforementioned relays, the WAIT routine is initiated at step 200 and is in the form of a software timer shown as element 91 in the microcontroller 88. This subroutine involves the loading of a hexadecimal 32 in the software timer status register 93, where 32 is the number of interrupts which occurs in one second. Since the clock frequency of the microcontroller 88 in a preferred embodiment is 6 MHz and since at this clock frequency an 8-bit word permits the clock to count up to 256, the software timer is loaded with the number 6 at step 204 so that it starts counting from 6 and counts up to 256 to provide for the counting of 250 clock cycles rather than 256. The timer is enabled and the counter counts from 6 to 256 at step 206 and allows an interrupt to occur. The program stored in the microcontroller 88 then monitors the contents of the status register 93 at step 208 until it is determined that the status register is at 0 whereupon the program branches to step 210 and stops the software timer and disables the interrupts. A loop subroutine is used at step 208 to monitor the contents, of the status register 93. After the software timer 91 is stopped and the interrupts have been disabled at step 210, the program returns to the main program as shown in FIGS. 9 and 10 and proceeds to decrement the number of the register by 1 as shown at steps 170 and 184, respectively, therein. The WAIT subroutine thus provides for a predetermined time period which in a preferred embodiment is 1 second, to be incorporated in the sequential activation and deactivation of each of the peripherals in order to allow switching transients to settle out of the computer system prior to the subsequent activation or deactivation of the next peripheral.

Referring to FIG. 12, there is shown a simplified flow chart illustrating the steps involved in the TIMER INTERRUPT subroutine. The TIMER INTERRUPT subroutine is initiated at step 188 upon the occurrence of a timer interrupt and results in the turn-off of the software timer and the disabling of the interrupts at step 190. The program then decrements the contents of the status register 93 by 1 to indicate that one interrupt has occurred. The program then loads a 6 into the microcontroller's software timer 91 at step 194. The software timer is again started and the interrupts are enabled at step 196, with the program returning to the WAIT subroutine shown in FIG. 12 until all 32 interrupts have occurred and the contents of the microcontroller's status register 93 have been decremented to 0 as determined at step 208. Following the occurrence of 32 interrupts, a 1 second time interval has expired between the successive turn-on or turn-off of the various peripherals controlled by the computer power controller 10 of the present invention.

There has thus been shown a power controller for use with a computer terminal for sequentially actuating or deactuating a plurality of relays each coupled to an AC line and to a respective peripheral device in the computer terminal wherein the AC line energizes a respective one of the computer terminal peripherals when a corresponding relay is actuated. By sequentially actuating or deactuating each of the relays following a predetermined time delay, each of the computer terminal peripherals is energized or de-energized in a sequential, time delayed manner to allow switching transients and line voltage fluctuations to settle out of the power supply line before the next peripheral is either turned on or turned off.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a system having a central processor unit and a plurality of peripheral devices coupled thereto, wherein said central processor unit and each of said peripheral devices is coupled to and energized by an AC power source and wherein the operation of said peripheral devices is under the control of said central processor unit with each of said peripheral devices characterized by a unique susceptibility to AC power source transients giving rise to improper operation of the peripheral device, a power controller comprising:

a plurality of switch means each coupled to said AC power source and to a respective peripheral device for providing AC power thereto;

control means coupled to each of said switch means for providing a respective control signal thereto whereupon a respective switch means is rendered conductive for providing AC power to a peripheral device coupled thereto; and sequence means coupled to said control means for causing said control means to provide said control signals to and to remove said control signals from each of said switch means such that AC power is provided last and is removed first in a sequential manner from those peripheral devices having a higher susceptibility to AC power source transients and AC power is provided first and is removed last in a sequential manner from those peripheral devices having a lower susceptibility to AC power source transients.

2. The power controller of claim 1 further comprising timing means coupled to said control means for providing a predetermined time delay between the providing of said control signals to and the removal of said control signals from each of said switch means such that AC power is provided to and removed from each of the peripheral devices following said predetermined time delay.

3. The power controller of claim 2 wherein said sequence means is programmable to allow for the incorporation of additional peripheral devices in the system or the removal of peripheral devices from the system while continuing to provide for the sequential application of AC power thereto or the sequential removal of AC power therefrom.

4. The power controller of claim 3 wherein said timing means is programmable to allow said predetermined time delay to be established as desired.

5. The power controller of claim 4 further comprising visual indication means coupled to said control means and responsive to said control signals output therefrom for providing a visual indication when AC power is provided to a respective one of said peripheral devices.

6. The power controller of claim 1 wherein each of said control means includes a relay and a pair of contacts, with each of said relays coupled to said control means and each pair of contacts coupled to the AC power source and to a respective peripheral device.

7. The power controller of claim 6 further comprising voltage/current translation means coupled between said control means and each of said relays for providing increased voltage and current thereto.

8. The power controller of claim 7 further comprising device status display means coupled to said voltage/current translation means for providing a visual indication of those peripheral devices to which the AC power is provided.

9. The power controller of claim 8 further comprising filter means coupled between the AC power source and each pair of contacts for filtering out transients and RF frequency signals from the AC source.

10. The power controller of claim 9 further comprising user responsive selector means coupled to said control means for providing AC power to the plurality of peripheral devices in a first sequential order upon initial engagement of said selector means and for removing AC power from the plurality of peripheral devices in a second sequential order upon a next subsequent engagement of said selector means, wherein said first sequential order is the reverse of said second sequential order.

* * * * *

UNITED STATES PATENT AND TRADEMARK OFFICE
CERTIFICATE OF CORRECTION

PATENT NO. : 4,674,031
DATED : June 16, 1987
INVENTOR(S) : Andrew F. Siska, Jr.

It is certified that error appears in the above—identified patent and that said Letters Patent is hereby corrected as shown below:

Column 2, lines 58 and 59, "oomputer" should be -- computer --.

Column 9, line 14, "ooupled" should be -- coupled --.

Signed and Sealed this

Twenty-ninth Day of September, 1987

Attest:

DONALD J. QUIGG

Attesting Officer      Commissioner of Patents and Trademarks